United States Patent
Miyazawa

(10) Patent No.: US 6,781,311 B2
(45) Date of Patent: Aug. 24, 2004

(54) CERAMIC ENVELOPE FOR INTENSITY DISCHARGE LAMP

(75) Inventor: Sugio Miyazawa, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 85 days.

(21) Appl. No.: 10/057,005

(22) Filed: Oct. 29, 2001

(65) Prior Publication Data

US 2002/0089286 A1 Jul. 11, 2002

(30) Foreign Application Priority Data

Oct. 31, 2000 (JP) .................................. 2000-333360

(51) Int. Cl.$^7$ ................................................ H01J 17/18
(52) U.S. Cl. ..................... 313/623; 313/624; 313/625; 313/493; 313/634
(58) Field of Search ................................ 313/623, 624, 313/625, 493, 634

(56) References Cited

U.S. PATENT DOCUMENTS

| | | |
|---|---|---|
| 3,243,635 A | 3/1966 | Louden et al. |
| 3,832,590 A | 8/1974 | Yamazaki et al. |
| 3,875,277 A | 4/1975 | Bratton et al. |
| 4,387,067 A | 6/1983 | Kobayashi et al. |
| 4,625,149 A | 11/1986 | Danno et al. |
| 4,629,593 A | 12/1986 | Groh et al. |
| 4,799,601 A | 1/1989 | Shimai et al. |
| 5,635,794 A | 6/1997 | Koerfer |
| 5,780,377 A | 7/1998 | Wajima et al. |

FOREIGN PATENT DOCUMENTS

| | | |
|---|---|---|
| EP | 0 220 633 A | 5/1987 |
| EP | 0 284 576 A | 9/1988 |
| EP | 0 667 322 A1 | 8/1995 |
| EP | 0 722 183 A | 7/1996 |
| EP | 0 954 010 A1 | 11/1999 |
| EP | 0 991 108 A2 | 4/2000 |
| GB | 1 360 340 A | 7/1974 |

OTHER PUBLICATIONS

U.S. patent application Ser. No. 10/057,801, Miyazawa, filed Oct. 20, 2001.
U.S. patent application Ser. No. 10/057,005, Miyazawa, filed Nov. 21, 2001.
Patent Abstracts of Japan. vol. 008, No. 095 (E–242), May 2, 1984 & JP 59 014245 A (Nihon Gaishi KK), Jan. 25, 1984 *abstract*.
Patent Abstracts of Japan. vol. 1999, No. 10, Aug. 31, 1999 & JP 11 135 064 A (NGK Insulators Ltd.), May 21, 1999 *abstract*.
Patent Abstracts of Japan. vol. 009, No. 136 (E–320), Jun. 12, 1985 & JP 60 020446 A (Mitsubishi Denki KK), Feb. 1, 1985 *abstract*.
Patent Abstracts of Japan. vol. 1998, No. 14, Dec. 31, 1998 & JP 10 247476 A (Toshiba Lighting & AMP; Technol Corp), Sep. 14, 1998 *abstract*.

*Primary Examiner*—Vip Patel
(74) *Attorney, Agent, or Firm*—Burr & Brown

(57) ABSTRACT

A ceramic envelope for high intensity discharge lamp is provided including a cylindrical barrel section forming an electric discharge light emitting space; and having annular closing sections closing both ends of the barrel, respectively; and capillary sections that insert and fix an electric discharge electrode to protruded outwardly so as to be to oppose each other from the substantial center of both closing sections. The envelope essentially consists of alumina, and is formed to have light transmission properties by adding MgO. Then, the thickness of the barrel section at the boundary between the barrel section and the closing section is increased by providing a tapered section in the vicinity of the center of an electric discharge light emitting space. Thus, a high emitting envelope for high intensity discharge lamp capable of extending the service life of the lamp can be provided, even if the electric discharge space is cylindrical.

11 Claims, 4 Drawing Sheets

Enlarged view

Enlarged view (a)

Enlarged view (b)

CERAMIC ENVELOPE FOR INTENSITY DISCHARGE LAMP

BACKGROUND OF THE INVENTION

1. Field of the Invention

The present invention relates to a ceramic envelope made of a light transmission ceramics used for a high intensity discharge lamp such as a high pressure sodium lamp or a metal halide lamp.

2. Description of Related Art

Conventionally, an electric discharge lamp using a ceramic envelope made of a light transmission ceramics whose electric discharge light emitting space is formed in a cylindrical shape is widely used as a ceramics metal halide lamp. Such a ceramic envelope has a structure as shown in FIG. 5A and FIG. 5B, i.e., a cylindrical barrel section 10 forming an electric discharge light emitting space at its center. Its left and right ends are closed by an annular closing material 11, and its structure is provided such that a capillary tube 12 is connected in an orientation opposite to each other at the substantial center of the closing material 11. Then, after a light emitting substance or startup gas is sealed in an electric discharge light emitting space, an electrode is inserted into the capillary tube 12, and is sealed, thereby forming an electric discharge lamp.

These sections such as the barrel section 10, closing plate 11, and capillary tube 12 are each molded independently, and are integrally coupled with each other, thereby forming a ceramic envelope.

In the above ceramic envelope having the cylindrical electric discharge light emitting space, a temperature at a corner part of a cylinder is the lowest during lighting. Thus, a light emitting substance that is a corrosive substance easily accumulates at that site. As a result, though a light color change in the lighting direction is reduced, corrosion at the corner is easily advanced because the light emitting substance easily accumulates. The corrosion at that portion determines a service life of the lamp.

In addition, in such a ceramic envelope having a cylindrical electric discharge space, there is employed a fabrication method in which plural parts are assembled and bonded due to contraction action during burning. In another case as shown in FIG. 5A which is a partially enlarged view of the container, a wedge shaped cavity 13 is easily formed at a bonding section. In particular, a light emitting substance easily enters the cavity 13 generated at the corner of the barrel section 10, which causes corrosion, and impairs extended service life. Further, such a wedge shaped cavity easily causes stress concentration, and extended service life is impaired due to a thermal stress generated during lighting.

In addition, when the barrel section 10 is bonded with a double-ended closing material 11, as shown in FIG. 5A, the barrel section is gradually converged in the vicinity of its center. As shown in FIG. 5B, a constant diameter is maintained in the vicinity of the center of the barrel section, however, the diameter is changed or increased at the corner of an electric discharge light emitting space. In any case as well, an inner diameter D5 at the center of the barrel section is always smaller than an inner diameter D6 of an end.

This difference of the diameters is because a distance between an electric discharge arc and the barrel section during lighting is required to maintain a predetermined value due to restriction on material strength. Therefore, the inner diameter of the end was set much greater than its need when the inner diameter of a light emitting section was set with the arc and the vicinity of the center of the barrel section being a reference. As a result, the coolest point temperature is, of course, low. Thus, a light emitting substance easily accumulates, and corrosion is accelerated, which causes impairment of the extended service life.

Further, the linear transmission rate of a ceramic envelope depends on the surface roughness Ra, and thus, the smaller Ra is advantageous. Although the surface roughness of the interior surface of the ceramic envelope can be controlled by means of polishing, the process becomes complex, which is not rational. In addition, MgO or $La_2O_3$ and the like which are weaker with respect to a relevant halide than alumina mixed as an additive, appears on the interior surface by such polishing. Thus, there has been a disadvantage to maintain good electric discharge characteristics.

SUMMARY OF THE INVENTION

The present invention has been made in view of the foregoing problem. It is an object of the present invention to provide a ceramic envelope for high intensity discharge lamp that makes it possible to extend service life of the lamp even if an electric discharge light emitting space is formed in a cylindrical shape.

According to a first aspect of the present invention, there is provided a ceramic envelope for high intensity discharge lamp made of a light transmission ceramics, comprising:

a cylindrical barrel section forming an electric discharge light emitting space;

an annular closing section that closes both ends of the barrel section, respectively;

a capillary section for inserting and fixing an electric discharge electrode to be outwardly protruded so as to be opposed to each other from a substantial center position of both closing sections, wherein the barrel section thickness of at least one of the boundary sections between both of the barrel section and closing section is continuously increased at a ratio from 1.2 to 2.0 relevant to the thickness in the vicinity of the center of the electrical discharge light emitting space.

With this construction, even if a light emitting substance accumulates at an electric discharge space corner, a time required predetermined amount of corrosion reduction can be prolonged, and service life of the lamp can be extended.

According to a second aspect of the present invention, there is provided a ceramic envelope for high intensity discharge lamp made of a light transmission ceramics, comprising:

a cylindrical barrel section forming an electric discharge light emitting space;

an annular closing section that closes both ends of the barrel section, respectively;

a capillary section for inserting and fixing an electric discharge electrode to be outwardly protruded so as to be opposed to each other from a substantial center position of both closing sections, wherein a ratio of an inner diameter in the vicinity of an end of said barrel section to an inner diameter of the center of the barrel section is equal to or greater than 0.8 and is less than 1.

By doing this, there is no need that a distance between an electric discharge space corner and a center is extended longer than necessary. Thus, the coolest point temperature does not fall more than necessary, and the light emission characteristics such as efficiency are improved.

According to a third aspect of the present invention, there is provided a ceramic envelope for high intensity discharge lamp made of a light transmission ceramics, said envelope comprising:

a cylindrical barrel section forming an electric discharge light emitting space;

an annular closing section that closes both ends of the barrel section, respectively;

a capillary section for inserting and fixing an electric discharge electrode to be outwardly protruded so as to be opposed to each other from a substantial center position of both closing sections, wherein a surface roughness Ra of the interior surface of said barrel section is 0.01 µm to 0.4 µm, and the additive concentration in the vicinity of the interior surface of said barrel section is ½ or less of that in the vicinity of the center of the thickness.

By doing this, the light transmission of the barrel section can be improved, reaction with halide is restrained, and good electric discharge characteristics can be maintained. In particular, the surface roughness Ra is preferably from 0.01 µm to 0.1 µm.

According to a fourth aspect of the present invention, there is provided a ceramic envelope for high intensity discharge lamp made of a light transmission ceramics, said envelope comprising:

a cylindrical barrel section forming an electric discharge light emitting space;

an annular closing section that closes both ends of the barrel section, respectively;

a capillary section for inserting and fixing an electric discharge electrode to be outwardly protruded so as to be opposed to each other from a substantial center position of both closing sections, wherein the barrel section thickness of at least one of the boundary sections between both of the barrel section and closing section is continuously increased at a ratio from 1.2 to 2.0 relevant to the thickness in the vicinity of the center of an electric discharge light emitting space, and a ratio of a diameter in the vicinity of an end of the barrel section to a diameter of the center of the barrel section is equal to or greater than 0.8, and is less than 1.0.

With this construction, even if a light emitting substance accumulates at an electric discharge light emitting space corner, a time required predetermined amount of corrosion reduction can be prolonged.

In addition, there is no need that a distance between an electric discharge space corner and a center is extended longer than necessary. Thus, lowering the coolest point temperature more than necessary does not occur, and the service life of the lamp can be further extended. Further, the light emission characteristics such as efficiency are improved.

According to a fifth aspect of the present invention, there is provided a ceramic envelope for high intensity discharge lamp as described above, wherein the surface roughness Ra of the anterior surface of the barrel section is from 0.01 µm to 0.4 µm, and the additive concentration of the surface of said barrel section is ½ or less of that in the vicinity of the center of the thickness.

According to a sixth aspect of the present invention, there is provided a ceramic envelope for high intensity discharge lamp, wherein an additive consists of at least one or more kinds of $ScO_3$, $MgO$, $ZrO_2$, $Y_2O_3$, and lanthanoid based rare earth oxide.

By doing this, abnormal grain growth of a ceramics base phase represented by alumina can be restrained, and uniform grain growth can be produced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principle of the present invention.

DETAILED DESCRIPTION OF THE INVENTION

Figure 1:
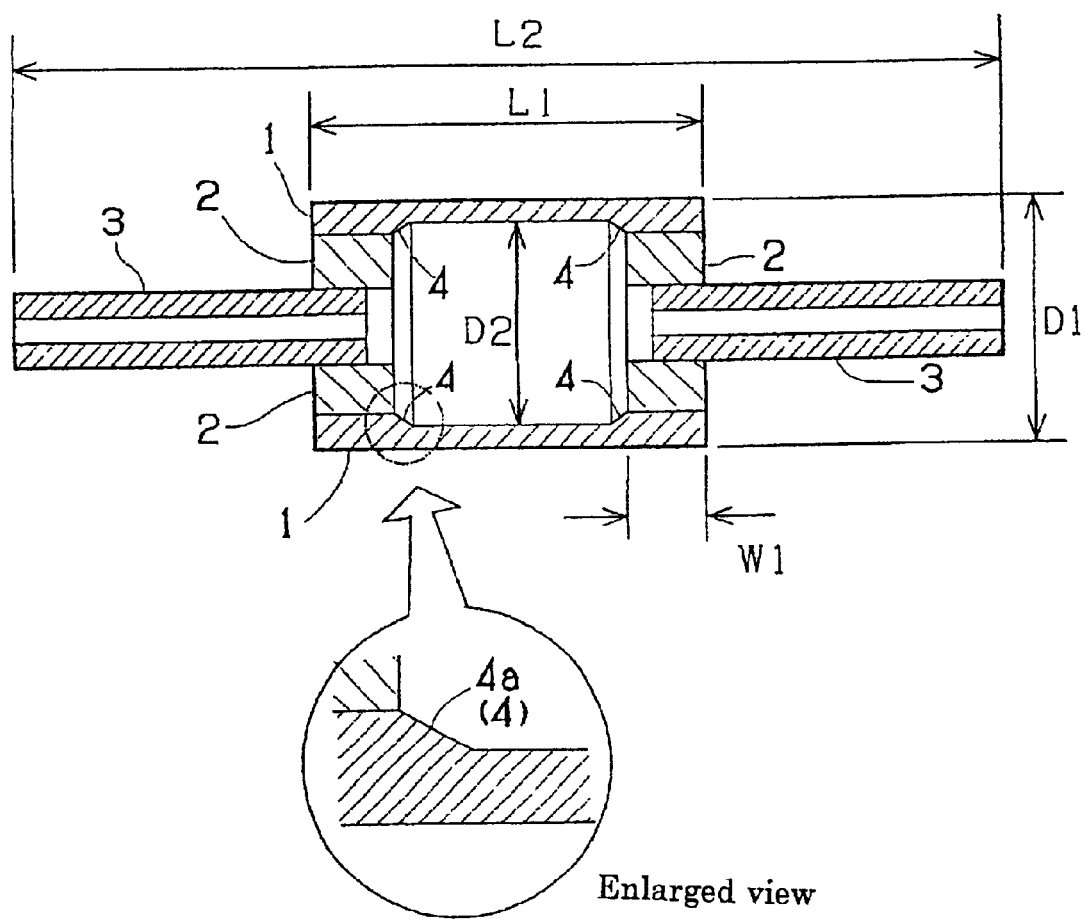
FIG. 1 is a sectional view and a partially enlarged view of a ceramic envelope for high intensity discharge lamp illustrating a first embodiment of the present invention.

Reference will now be made in detail to the presently preferred embodiments of the invention as illustrated in the accompanying drawings, in which like reference numerals designate like or corresponding parts.

Hereinafter, preferred embodiments of the present invention will be described with reference to the accompanying drawings. FIG. 1 is an illustrative cross section showing a first embodiment of a ceramic envelope for high intensity discharge lamp according to the present invention. This envelope has a cylindrical barrel section 1 that forms an electric discharge light emitting space at its center. Its both ends are closed by annular closing sections 2, 2, and capillary sections 3, 3 in small diameter are brought into protrusive contact with each other so as to be in parallel to the barrel section 1 from the center of the closing section 2 and opposite to each other. These capillary sections 3 are intended to insert, seal, and fix a rod shaped electrode conductor (not shown) having an electric discharge electrode at its tip end.

These members are separately molded from an alumina-based component with MgO and the like as an additive. Then, the members are formed so as to give light transmission properties by integrally being assembled and fired. An example of dimensions of each section is shown here. An outer diameter D1 of the barrel section 1 is 11.6 mm, an inner diameter D2 is 9.4 mm, a length 1.1 is 19 mm, thickness W of the closing section is 3 mm, and a full length L2 of a light emitting tube is 47 mm. The surface roughness Ra including an interior surface is 0.2 μm.

In addition, essential parts of the electric discharge light emitting space of the barrel section 1 are formed in their substantially same thickness. As shown in FIG. 1 which is an enlarged view of the envelope, on an interior face of the barrel section 1 at the boundary part with the closing section 2 that is an electric discharge light emitting space corner, a tapered section 4a is provided as a thickness change section 4. This tapered section is formed so as to be linearly continuous toward the closing plate 2 and increase the thickness.

Additives to be added to alumina may include MgO, $Sc_2O_3$, $ZrO_2$, $Y_2O_3$ or lanthanoid base rare earth oxide or may be a combination of these substances.

In this way, by adding the additives, abnormal grain growth of a ceramic base phase essentially consisting of alumina is restrained, uniform grain growth can be produced, and the linear transmission rate can be increased. However, the surface roughness Ra is preferably within the range of 0.01 μm to 0.4 μm in view of light transmission properties and strength.

In addition, in a firing process, the additive in the vicinity of the surface of the ceramic envelope is dispersed or scattered, whereby the surface additive concentration can be ½ or less as compared with the inside of the thickness. By doing this, the additive concentration of the surface of the ceramic envelope is not increased after burningfiring. Therefore, reaction with halide that is a light emitting substance can be restrained, and the good electric discharge characteristics can be maintained.

In addition, the electric discharge light emitting space corner of the barrel section which is easily corroded is increased in thickness, whereby, even if a wedge shaped cavity occurs, a time required predetermined amount of corrosion reduction can be increased, and the service life of the lamp can be extended. As a result, since the electric discharge light emitting space corner is close to an electric discharge arc, the coolest point temperature is not lowered more than necessary, and advancement of the corrosion can be restrained.

It is required to continuously make this change in thickness because a sudden change in thickness causes stress concentration. In addition, there is an upper limit in thickness from the viewpoint of light emission efficiency. It is preferable that a change in thickness be from 1.2 times to 2.0 times of the thickness in the vicinity of the center of the light emitting section.

Figure 2:
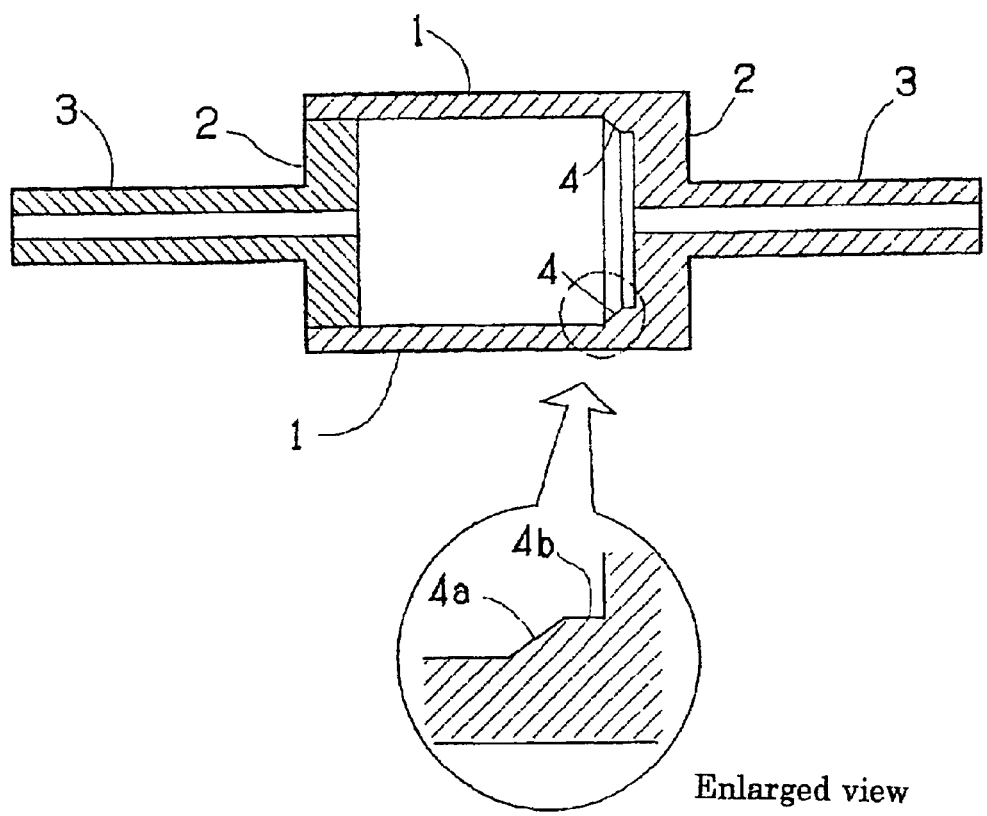
FIG. 2 is a sectional view and a partially enlarged view of a ceramic envelope for high intensity discharge lamp illustrating a second embodiment of the present invention.

FIG. 2 is an illustrative cross section of a ceramic envelope illustrating a second embodiment of the present invention. In the figure, the thickness of the barrel section is increased at one corner in the electric discharge light emitting space (like elements shown in FIG. 1 are designated by like reference numerals. This applies to the following drawings.). In this case, a ceramic envelope is fabricated by combining two members, i.e., a molding element which is formed by integrating the barrel section 1, one closing section 2, and capillary section 3, and a molding element which is formed by integrating another capillary section 3 and a closing plate 2. The thickness change section 4 is gradually increased in thickness by providing the tapered section 4a. Then, a constant thickness section making the thickness uniformed is provided. In addition, the materials or additives and the like are similar to those of the above embodiment.

In the case where a ceramic envelope is erected for use, a light emitting substance easily accumulates at the lower end of the electric discharge space. Because of this, increasing only the thickness of one end of the barrel section 1 that is downward is effective in extending the service life of the electric discharge lamp. In addition, an increase in thickness may not be a simple tapered face as shown in FIG. 2. In addition, such two members are assembled, thereby making it possible to fabricate the ceramic envelope.

Figure 3:
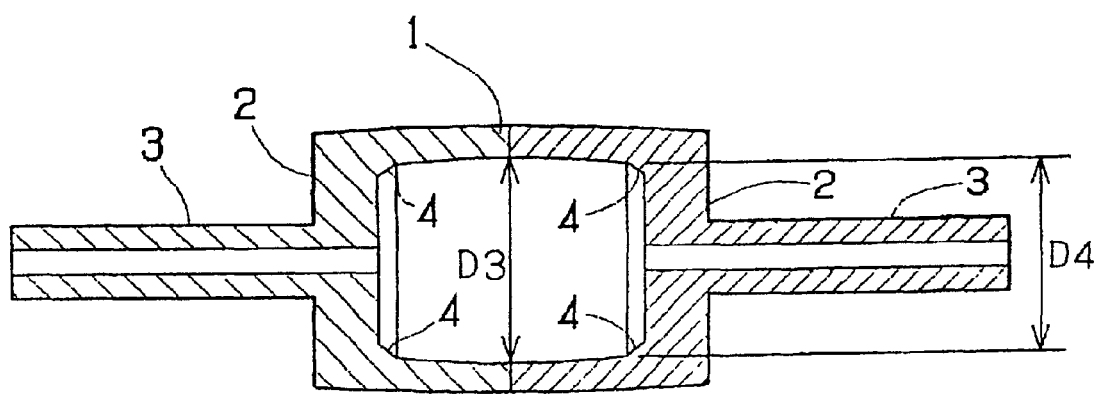
FIG. 3 is a sectional view and a partially enlarged view of a ceramic envelope for high intensity discharge lamp illustrating a third embodiment of the present invention.

FIG. 3 shows a third embodiment of a ceramic envelope according to the present invention. The figure also shows another example of a ceramic envelope fabricated by assembling the two members, showing a case in which molding elements formed in a shape divided into two sections are integrated in abutment in the vicinity of the center of the barrel section 1. The inner diameter D4 of an end of the barrel section 1 is formed to be 0.95 times, for example, which is smaller than the inner diameter D3 of the center, and the vicinity of the center is swelled.

In this way, the ceramic envelope may be divided at the center, and be formed of two members in the same shapes. By doing this, the center of the barrel section 1 can be easily swelled (the end of the barrel section can be converged). By forming the envelope in the manner described above, advantageous effect similar to that of the above embodiment can be attained. According to this molding element, no wedge shaped cavity is formed at the boundary part between the barrel section 1 and the closing section 2. Moreover, the corner of the electric discharge light emitting space is not distant from an electric discharge arc more than necessary. In addition, the coolest point temperature is not lowered more than necessary. Therefore, a constant increase in service life and improvement of the light emission characteristics can be expected.

If the inner diameter D4 in the vicinity of the end of the barrel section 1 is smaller than 0.8 times relevant to the inner diameter D3 in the vicinity of the center, a color change in the lighting direction is significant, which is not preferable. In addition, if it is 1 times or more, a thermal stress concentrates at the end of the barrel section, so that a cracking frequency increases, which is not preferable as well. Therefore, it is preferable that the inner diameter D4 of the end is equal to or greater than 0.8 times or is less than 1.0 times relevant to the inner diameter D3 of the center. Further preferably, a value from 0.9 times to 0.97 times is effective.

Figure 4:
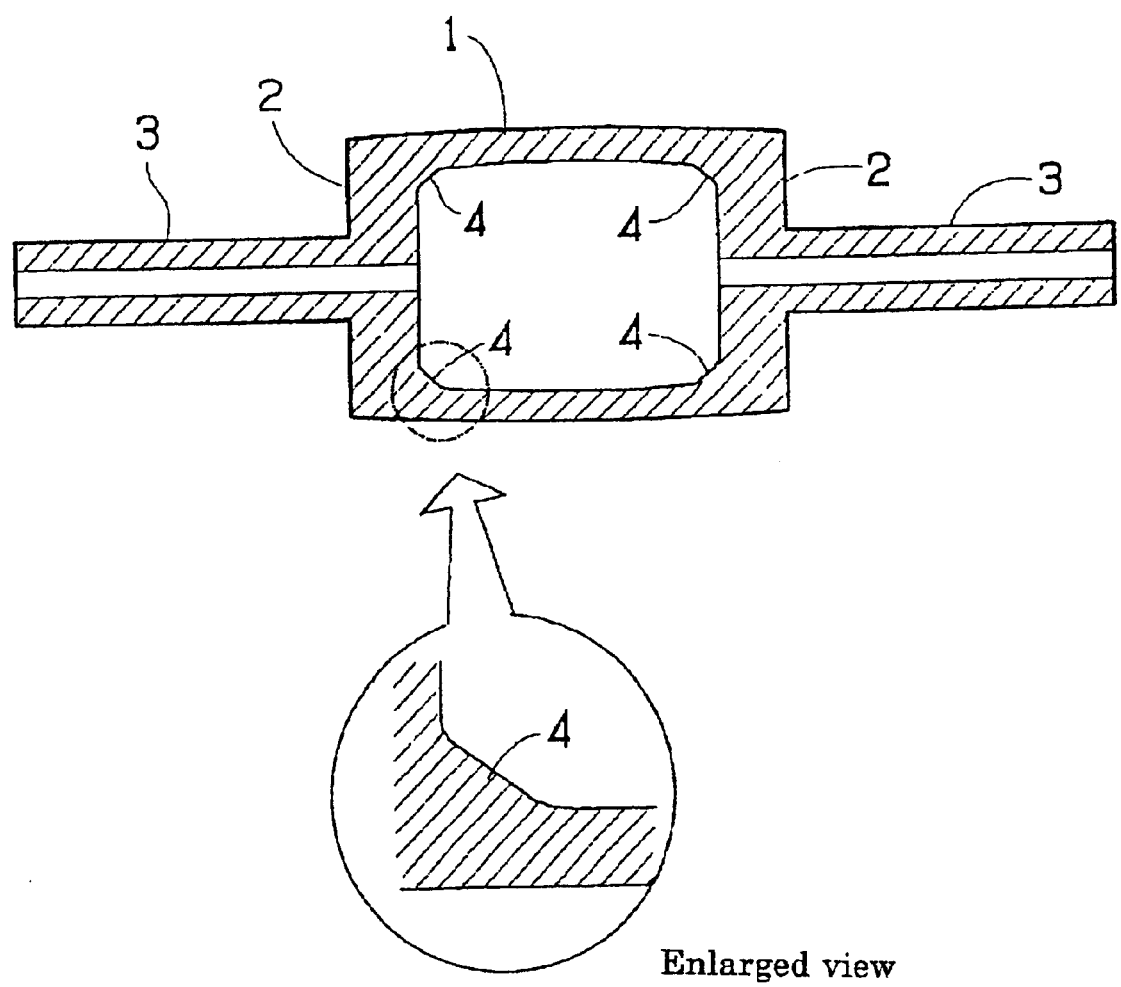
FIG. 4 is a sectional view and a partially enlarged view of a ceramic envelope for high intensity discharge lamp illustrating a fourth embodiment of the present invention.
Figure 5:
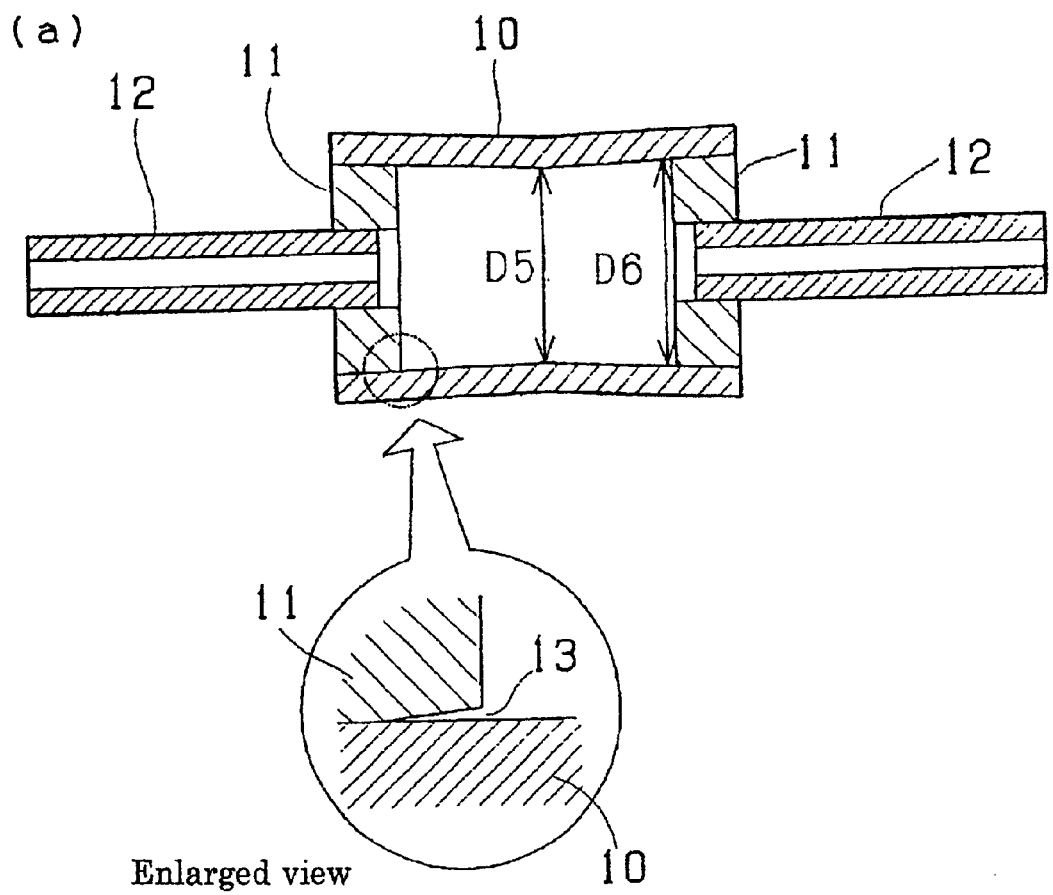
FIG. 5A and FIG. 5B are illustrative cross sections of a conventional ceramic envelope for high intensity discharge lamp having a cylindrical electric discharge light emitting space, wherein reference numeral 1 denotes a barrel section; reference numeral 2 denotes a closing section; reference numeral 3 denotes a capillary section; reference numeral 4 denotes a thickness change section; and reference numeral 4a denotes a tapered section.
Figure 5:
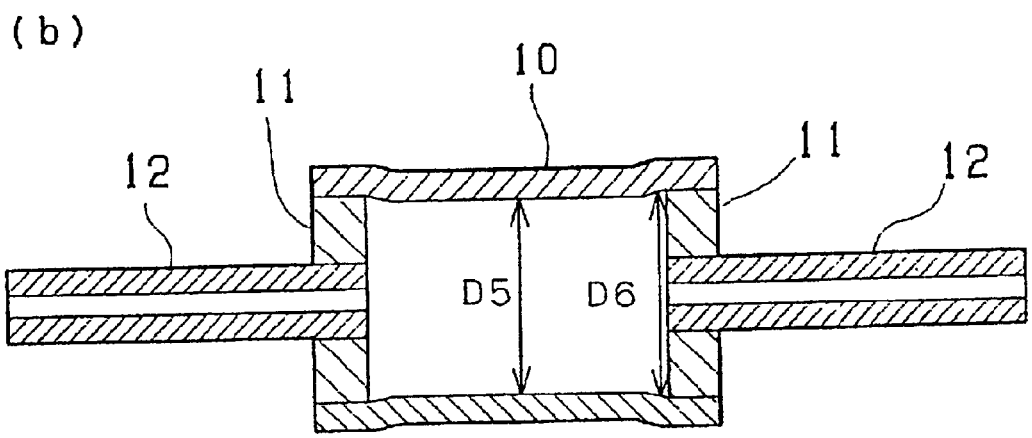

FIG. 4 shows a fourth embodiment of the present invention. The figure also shows a ceramic envelope produced by integrally molding of the entirety, barrel section 1, closing section 2, and capillary section 3. The materials of each section are similar to those according to the above described embodiment. Here, the thickness change section 4 is continuously increased in thickness, by forming curve and by gently changing its shape.

As in FIG. 3, the end of the barrel section is formed to be converged.

By using above integral molding, it can be easier to mold without generating any interface each of barrel section, closing section, and capillary section compared with the above first to third embodiments. This is because the entire water content ratio or partial water content ratio as well as the composition of each section must be finely adjusted so as not to generate the interface in the first to third embodiments.

However an interface may occur because of such adjustment. In that case, treatment to increase a fitting strength of each section in the sintering process or the like is required to prevent concentration of a thermal stress on the interface or attach of the light emitting substance. On the other hand, integral molding can be carried out without an interface, thus making it unnecessary to carry out adjustment or treatment. Moreover, integral molding is preferable from the viewpoint of extended service life as compared with the first to third embodiments in which an interface may exist.

By means of a lost wax or by applying a hit molding techniques, injection molding technique, or gel casting technique to the lost wax, such integration molding can be easily carried out. By carrying out integral molding, no wedge shaped cavity is formed, and the service life can be extended constantly. In addition, by carrying integral molding, the ratio of a diameter in the vicinity of an end of the barrel section 1 and a diameter in the vicinity of the center can be arbitrarily set. Further, the surface rough Ra of the interior surface of the barrel section can easily achieved to be within 0.01 μm to 0.4 μm.

In this way, if the interior face of the barrel section at the boundary part with the closing section which corresponds to an electric discharge light emitting space corner is increased in thickness in a continuous change so as not to produce a stepped section, it is effective in extending the service life of the high intensity discharge lamp. Such change may be linear or curved. In addition, the end of the barrel section is converged, thereby making it unnecessary to ensure that the electric discharge light emitting space corner is distant from an electric discharge arc more than necessary. Thus, the service life of the lamp can be extended.

Additional advantages and modifications will readily occur to those skilled in the art. Therefore, the invention in its broader aspect is not limited to the specific details and representative embodiments shown and described herein. Accordingly, various modifications may be made without departing from the spirit or scope of the general inventive concept as defined by the appended claims and their equivalents.

What is claimed is:

1. A ceramic envelope for a thigh intensity discharge lamp made of a light transmission ceramic material, comprising:
   a cylindrical barrel section forming an electric discharge light emitting space;
   an annular closing section that closes each end of said barrel section, respectively; and
   a capillary section for inserting and fixing an electric discharge electrode to be outwardly protruded so as to be opposed to each other extending from a substantially central position of each said annular closing section;
   wherein a barrel section thickness of at least one boundary section between said barrel section end each said annular closing section is continuously increased at a ratio from 1.2 to 2.0 relative to a thickness of said barrel section in the vicinity of a center of said electric discharge light emitting space.

2. A ceramic envelope for a high intensity discharge lamp made of a light transmission ceramic material, comprising:
   a cylindrical barrel section forming an electric discharge light emitting space;
   an annular closing section that closes both ends each end of said barrel section, respectively; and
   a capillary section for inserting and fixing an electric discharge electrode to be outwardly protruded so as to be opposed to each other extending from a substantially central position of each said annular closing section;
   wherein a ratio of an inner diameter of said barrel section, in the vicinity of an end of said barrel sections, to an inner diameter of a center of said barrel section is at least 0.8 and less than 1.0.

3. A ceramic envelope for high intensity discharge lamp made of a light transmission ceramic material, comprising:
   a cylindrical barrel section forming an electric discharge light emitting space;
   an annular closing section that closes each end of said barrel section, respectively; and
   a capillary section for inserting and fixing an electric discharge electrode to be outwardly protruded so as to be opposed to each other extending from a substantially central position of each said annular closing section;
   wherein a surface roughness Ra of an interior surface of said barrel section is in a range of 0.01 μm to 0.4 μm, and an additive concentration in the vicinity of said interior surface of said barrel section is ½ or less of that in the vicinity of the center of the thickness.

4. A ceramic envelope for a high intensity discharge lamp made of a light transmission ceramic material, comprising:
   a cylindrical barrel section forming an electric discharge light emitting space;
   an annular closing section that closes each end of said barrel section, respectively; and
   a capillary section for inserting and fixing an electric discharge electrode to be outwardly protruded so as to be opposed to each other extending from a substantially central position of each said annular closing section;
   wherein a barrel section thickness of at least one boundary section between said barrel section and each said annular closing section is continuously increased at a ratio from 1.2 to 2.0 relative to a thickness of said barrel section in the vicinity of a center of said electric discharge light emitting space, and a ratio of a diameter of said barrel section, in the vicinity of an end of said barrel sections to a diameter of a center of said barrel section is at least 0.8 and less than 1.0.

5. The ceramic envelope for a high intensity discharge lamp as claimed in claim 1, wherein a surface roughness Ra of an interior surface of said barrel section is in a range of 0.01 μm to 0.4 μm, and an additive concentration of the surface of said barrel section is ±4 or less of that in the vicinity of the center of the thickness.

6. The ceramic envelope for thigh intensity discharge lamp as claimed in claim 3, wherein said additive consists of at least one of $Sc_2O_3$, $MgO$, $ZrO_2$, $Y_2O_3$, and lanthanoid based rare earth oxides.

7. The ceramic envelope for a high intensity discharge lamp as claimed in claim 2, wherein a surface roughness Ra of an interior surface of said barrel section is in a range of 0.01 μm to 0.4 μm, and an additive concentration of the surface of said barrel section is ½ or less of that in the vicinity of the center of the thickness.

8. The ceramic envelope for a high intensity discharge lamp as claimed in claim 4, wherein a surface roughness Ra of an interior surface of the barrel section is in a range of 0.01 μm to 0.4 μm, and an additive concentration of the surface of said barrel section is ½ or less of that in the vicinity of the center of the thickness.

9. The ceramic envelope for a high intensity discharge lamp as claimed in claim 5, wherein said additive consists of at least one of $Sc_2O_3$, $MgO$, $ZrO_2$, $Y_2O_3$ and lanthanoid based rare earth oxides.

10. The ceramic envelope for a high intensity discharge lamp as claimed in claim 7, wherein said additive consists of at least one of $Sc_2O_3$, $MgO$, $ZrO_2$, $Y_2O_3$ and lanthanoid based rare earth oxides.

11. The ceramic envelope for a high intensity discharge lamp as claimed in claim 8, wherein said additive consists of at least one of $Sc_2O_3$, $MgO$, $ZrO_2$, $Y_2O_3$ and lanthanoid based rare earth oxides.

* * * * *

UNITED STATES PATENT AND TRADEMARK OFFICE
CERTIFICATE OF CORRECTION

PATENT NO. : 6,781,311 B2
DATED : August 24, 2004
INVENTOR(S) : Sugio Miyazawa

It is certified that error appears in the above-identified patent and that said Letters Patent is hereby corrected as shown below:

Title page,
Item [56], References Cited, OTHER PUBLICATIONS, "U.S. patent application Ser. No. 10/057,005," reference, change "10/057,005" to -- 09/991,253 --
Item [57], ABSTRACT,
Line 1, add -- a -- after "for"
Line 2, add -- , -- after "provided"
Line 3, change ";" to -- , --
Line 4, add -- section -- after "barrel"; change ";" to -- , -- after "respectively"
Line 6, change "protruded" to -- protrude --; delete "be to" after the second occurrence of "to"

Column 2,
Line 8, change the second occurrence of "the" to -- a -- before "smaller"

Column 5,
Linr 32, delete "burning"

Column 7,
Line 37, change "thigh" to -- high --
Line 48, change "end" to -- and --
Line 64, change "sections" to -- section --
Line 67, add -- a -- after "for"

UNITED STATES PATENT AND TRADEMARK OFFICE
CERTIFICATE OF CORRECTION

PATENT NO. : 6,781,311 B2
DATED : August 24, 2004
INVENTOR(S) : Sugio Miyazawa

It is certified that error appears in the above-identified patent and that said Letters Patent is hereby corrected as shown below:

Column 8,
Line 31, change "sections" to -- section, --
Line 37, change "$\pm 4$" to -- $1/2$ --
Line 39, change "thigh" to -- high --; add -- a -- after "for"

Signed and Sealed this

Twenty-sixth Day of July, 2005

JON W. DUDAS
*Director of the United States Patent and Trademark Office*